(12) United States Patent
Peng

(10) Patent No.: US 10,324,328 B2
(45) Date of Patent: Jun. 18, 2019

(54) COA LIQUID CRYSTAL PANEL AND METHOD FOR MANUFACTURING THE SAME

(71) Applicant: SHENZHEN CHINA STAR OPTOELECTRONICS TECHNOLOGY CO., LTD., Shenzhen (CN)

(72) Inventor: Bangyin Peng, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 70 days.

(21) Appl. No.: 15/325,202

(22) PCT Filed: Oct. 26, 2016

(86) PCT No.: PCT/CN2016/103401
§ 371 (c)(1),
(2) Date: May 9, 2017

(87) PCT Pub. No.: WO2018/040265
PCT Pub. Date: Mar. 8, 2018

(65) Prior Publication Data
US 2018/0252961 A1 Sep. 6, 2018

(30) Foreign Application Priority Data
Aug. 31, 2016 (CN) .......................... 2016 1 0797256

(51) Int. Cl.
*G02F 1/1335* (2006.01)
*G02F 1/1339* (2006.01)
(Continued)

(52) U.S. Cl.
CPC .... *G02F 1/133514* (2013.01); *G02F 1/13394* (2013.01); *G02F 1/133512* (2013.01);
(Continued)

(58) Field of Classification Search
CPC ......... G02F 1/133512; G02F 1/133514; G02F 1/136222; G02F 2001/13396
See application file for complete search history.

(56) References Cited

U.S. PATENT DOCUMENTS

2004/0263724 A1* 12/2004 Kim .................. G02F 1/136213
349/106
2006/0048473 A1* 3/2006 Kim .................... G02F 1/13394
52/506.05

(Continued)

FOREIGN PATENT DOCUMENTS

| CN | 102385196 A | 3/2012 |
| CN | 103278963 A | 9/2013 |

(Continued)

OTHER PUBLICATIONS

Notification of Transmittal of the International Search Report and the Written Opinion of the International Searching Authority (Forms PCT/ISA/220, PCT/ISA/237, and PCT/ISA/210) dated Jun. 6, 2017, by the State Intellectual Property Office of People's Republic of China in corresponding International Application No. PCT/CN2016/103401. (12 pages).

(Continued)

*Primary Examiner* — Jessica M Merlin

(57) ABSTRACT

A COA liquid crystal display panel includes an upper substrate, a lower substrate facing the upper substrate, and a liquid crystal layer disposed between the upper substrate and the lower substrate. The upper substrate is obtained by forming: a black matrix layer on a first base plate, a common electrode layer on the black matrix layer and exposed first base plate, and spacers on the common electrode on regions (Continued)

corresponding to the black matrix layer. The lower substrate is obtained by forming: a gate electrode insulation layer on a second base plate, a color barrier layer on the gate electrode insulation layer, a protective layer on the color barrier layer, a pixel electrode layer on the protective layer at a position corresponding to a projection of the color barrier layer, and a flat layer on the protective layer on a position corresponding to a recess of the color barrier layer.

1 Claim, 6 Drawing Sheets

(51) Int. Cl.
*G02F 1/1343* (2006.01)
*G02F 1/1362* (2006.01)

(52) U.S. Cl.
CPC .............. *G02F 1/134309* (2013.01); *G02F 2001/13396* (2013.01); *G02F 2001/136222* (2013.01)

(56) References Cited

U.S. PATENT DOCUMENTS

| | | | |
|---|---|---|---|
| 2010/0141860 A1* | 6/2010 | Kim | G02F 1/13624 349/48 |
| 2011/0273649 A1* | 11/2011 | Matsui | G02F 1/133512 349/107 |
| 2012/0081652 A1* | 4/2012 | Su | C09K 19/12 349/191 |
| 2013/0100385 A1 | 4/2013 | Hou et al. | |
| 2014/0002778 A1* | 1/2014 | Lin | G02F 1/133512 349/106 |
| 2015/0248038 A1 | 9/2015 | Zhang et al. | |
| 2016/0033812 A1 | 2/2016 | Lu | |

FOREIGN PATENT DOCUMENTS

| | | |
|---|---|---|
| CN | 103676297 A | 3/2014 |
| CN | 105259693 A | 1/2016 |
| CN | 105652546 A | 6/2016 |
| CN | 105700258 A | 6/2016 |
| JP | 2003-5204 A | 1/2003 |

OTHER PUBLICATIONS

Office Action dated Sep. 20, 2017, by the State Intellectual Property Office of People's Republic of China in corresponding Chinese Patent Application No. 201610797256.9. (8 pages).

* cited by examiner

COA LIQUID CRYSTAL PANEL AND METHOD FOR MANUFACTURING THE SAME

CROSS-REFERENCE TO RELATED APPLICATIONS

The present application claims the priority of Chinese patent application CN 2016107972569, entitled "COA liquid crystal panel and method for manufacturing the same" and filed on Aug. 31, 2016, the entirety of which is incorporated herein by reference.

FIELD OF THE INVENTION

The present disclosure relates to the field of display technologies, and particularly, to a liquid crystal display panel and a method for manufacturing the liquid crystal display panel.

BACKGROUND OF THE INVENTION

A liquid crystal display device (LCD), with a wide range of advantages such as thin body, saving power, and free of radiation, has been extensively used in LCD TVs, mobile phones, personal digital assistants (PDAs), digital cameras, computer screens, etc.

With the development of science and technology, liquid crystal display devices are more and more widely used. In order to achieve a better color display of liquid crystal display devices, in a current liquid crystal display device, a color film layer is added on an array substrate, so as to achieve RGB three primary colors in the array substrate. Thus, an alignment operation can be avoided between the array substrate and a color film substrate, such that the liquid crystal display device can perform better full-color display. Such a technology is described as color filter on array (COA) technology.

As resolution of an LCD panel is getting higher, and pixel aperture ratio is getting smaller, added with restriction to a limit of alignment accuracy, transmittance of the LCD panel is getting lower with the increase in resolution. According to COA, as the RGB are all manufactured on an array side, alignment accuracy is improved. Therefore, with same resolution requirements, COA can get a higher aperture ratio.

Reference can be made to FIG. 1, which schematically shows the structure of a liquid crystal display panel in the prior art. As shown in FIG. 1, an upper substrate in the liquid crystal display panel, in a direction facing a liquid crystal layer, successively includes a first base plate, a black matrix layer, a common electrode layer, and a spacer. A lower substrate of the liquid crystal display panel, in a direction facing the liquid crystal layer, successively includes a second base plate, a gate electrode insulation layer, a color barrier layer, a protective layer, a flat layer, and a pixel electrode layer. Light passes through the second base plate, the gate electrode insulation layer, the color barrier layer, the protective layer, the flat layer, the pixel electrode layer, the liquid crystal layer, the common electrode layer, and the first base plate in the liquid crystal display panel in sequence, wherein each layer absorbs light, thereby reducing transmittance.

An existing liquid crystal display panel includes a flat layer in all positions corresponding to a color barrier layer. If such a color barrier can be less used, manufacturing costs will be reduced, and thus a cheaper liquid crystal display panel can be manufactured.

In view of the above problem, it is desirable in the art to find a new COA liquid crystal display panel to reduce use of organic materials, thereby reducing manufacturing costs. Thus, inexpensive liquid crystal display panels having high transmittance can be manufactured, thereby effectively solving the problem of low light transmittance and high costs of the existing liquid crystal display panel.

SUMMARY OF THE INVENTION

It is an objective of the present disclosure to provide a COA liquid crystal display panel and a method of manufacturing the same. The COA liquid crystal display panel has high light transmittance, can save material, and is of low costs, thereby effectively solving the problems of low light transmittance and high costs of an existing liquid crystal display panel.

In view of the above-mentioned problems in the prior art, the present disclosure proposes a COA liquid crystal display panel, comprising an upper substrate, a lower substrate facing the upper substrate, and a liquid crystal layer disposed between the upper substrate and the lower substrate, wherein the upper substrate includes a first base plate, a black matrix layer, a common electrode layer, and spacers, and wherein the lower substrate includes a second base plate, a gate electrode insulation layer, a color barrier layer, a protective layer, a pixel electrode layer, and a flat layer.

In one preferred embodiment of the present disclosure, the black matrix layer is provided on the first base plate; the common electrode layer is provided on the black matrix layer and exposed first base plate; and the spacers are provided on the common electrode layer corresponding to the black matrix layer.

In one preferred embodiment of the present disclosure, the color barrier layer includes a red color barrier, a blue color barrier, and a green color barrier, wherein the red color barrier and the green color barrier are two projections, while the blue color barrier is a recess.

In one preferred embodiment of the present disclosure, the red color barrier and the green color barrier are spaced from each other and have a same thickness, and the blue color barrier has a smaller thickness than the red color barrier or the green color barrier.

In one preferred embodiment of the present disclosure, the spacers are tapered columns comprising a main spacer and a secondary spacer.

In one preferred embodiment of the present disclosure, the main spacer and the secondary spacer are arranged corresponding to the blue color barrier.

In one preferred embodiment of the present disclosure, the main spacer and the secondary spacer are of same material, both being an elastic material.

In one preferred embodiment of the present disclosure, the main spacer has a greater height than the secondary spacer.

In preferred embodiment of the present disclosure, the gate electrode insulation layer is provided on the second base plate; the color barrier layer is provided on the gate electrode insulation layer; the protective layer is provided on the color barrier layer; the pixel electrode is provided corresponding to the projections of the color barrier layer; and the flat layer is provided corresponding to the recess of the color barrier layer.

In one preferred embodiment of the present disclosure, the common electrode layer is formed by physical vapor deposition.

In one preferred embodiment of the present disclosure, the black matrix layer is formed by a yellow light procedure.

In one preferred embodiment of the present disclosure, the black matrix layer is made of a black photoresist material In one preferred embodiment of the present disclosure, the yellow light procedure specifically includes a photoresist coating step, an exposure step, a developing step, and a curing step.

In one preferred embodiment of the present disclosure, the protective layer is made of silicon oxide.

In one preferred embodiment of the present disclosure, the flat layer is made of a transparent organic material.

In one preferred embodiment of the present disclosure, the gate electrode insulation layer is made of silicon nitride.

In one preferred embodiment of the present disclosure, the common electrode layer is made of indium tin oxide.

In one preferred embodiment of the present disclosure, the pixel electrode layer is made of indium tin oxide.

In one preferred embodiment of the present disclosure, the liquid crystal layer includes at least one polar liquid crystal monomer and at least one nonpolar liquid crystal monomer.

In one preferred embodiment of the present disclosure, liquid crystal molecules in the liquid crystal layer are negative liquid crystal molecules.

In one preferred embodiment of the present disclosure, the first base plate is glass substrate.

In one preferred embodiment of the present disclosure, the second base plate is glass substrate.

The present disclosure provides a method for manufacturing the COA liquid crystal display panel, comprising the following steps:

step 1): providing a first base plate which is brought into yellow light to form a black matrix layer on the first base plate by a yellow light procedure, step 2): forming a common electrode layer on the black matrix layer and exposed first base plate by physical vapor deposition, step 3): forming spacers on portions of the common electrode layer corresponding to the black matrix layer, to obtain an upper substrate, step 4): providing a second base plate on which a gate electrode insulation layer is formed, step 5): forming a color barrier layer on the gate electrode insulation layer, wherein the color barrier layer includes a red color barrier, a blue color barrier, and a green color barrier; the red color barrier and the green color barrier are two projections, while the blue color barrier is a recess; the red color barrier and the green color barrier are spaced from each other and have a same thickness; and the blue color barrier has a smaller thickness than the red color barrier or the green color barrier, step 6): forming a protective layer on the color barrier layer, step 7): forming, on the protective layer, a pixel electrode layer at positions corresponding to the projections of the color barrier layer, by physical vapor deposition, step 8): depositing an organic material on the protective layer at a position corresponding to the recess of the color barrier layer, to form a flat layer and obtain a lower substrate, and step 9): enabling a side of the upper substrate provided with the spacers to face a side of the lower substrate provided with the flat layer, instilling a liquid crystal between the upper substrate and the lower substrate, and vacuum aligning and fitting the upper substrate and the lower substrate, to form a liquid crystal layer therebetween and obtain the COA liquid crystal display panel.

In one preferred embodiment of the present disclosure, the spacers are tapered columns comprising a main spacer and a secondary spacer.

In one preferred embodiment of the present disclosure, the main spacer and the secondary spacer are arranged corresponding to the blue color barrier.

In one preferred embodiment of the present disclosure, the main spacer and the secondary spacer are of same material, both being an elastic material.

In one preferred embodiment of the present disclosure, the main spacer has a greater height than the secondary spacer.

In one preferred embodiment of the present disclosure, the common electrode layer is formed by physical vapor deposition.

In one preferred embodiment of the present disclosure, the black matrix layer is formed by a yellow light procedure.

In one preferred embodiment of the present disclosure, the black matrix layer is made of a black photoresist material In one preferred embodiment of the present disclosure, the yellow light procedure specifically includes a photoresist coating step, an exposure step, a developing step, and a curing step.

In one preferred embodiment of the present disclosure, the protective layer is made of silicon oxide.

In one preferred embodiment of the present disclosure, the flat layer is made of a transparent organic material.

In one preferred embodiment of the present disclosure, the gate electrode insulation layer is made of silicon nitride.

In one preferred embodiment of the present disclosure, the common electrode layer is made of indium tin oxide.

In one preferred embodiment of the present disclosure, the pixel electrode layer is made of indium tin oxide.

In one preferred embodiment of the present disclosure, the liquid crystal layer includes at least one polar liquid crystal monomer and at least one nonpolar liquid crystal monomer.

In one preferred embodiment of the present disclosure, liquid crystal molecules in the liquid crystal layer are negative liquid crystal molecules.

In one preferred embodiment of the present disclosure, the first base plate is glass substrate.

In one preferred embodiment of the present disclosure, the second base plate is glass substrate.

In addition, the technical features described above may be combined in various suitable ways or may be replaced by equivalent technical features as long as the objective of the present disclosure can be achieved.

Compared with the prior art, the present disclosure reduces use of the flat layer. That is, light passes through the second base plate, the gate electrode insulation layer, the color barrier layer, the protective layer, the pixel electrode layer, the liquid crystal layer, the common electrode layer, and the first base plate in the liquid crystal display panel successively. As the flat layer is less used, light is less absorbed, thereby improving light transmittance and reducing manufacturing costs. Hence, the problems of low light transmittance and high costs can be effectively solved.

In order to make the above contents of the present disclosure more obvious, the following description will be made in detail with reference to preferred embodiments and the accompanying drawings.

BRIEF DESCRIPTION OF THE DRAWINGS

The present disclosure will be explained in more detail with reference to embodiments and accompanying drawings, in which.

In the accompanying drawings, the same components are indicated by the same reference signs. The accompanying drawings are not drawn to an actual scale.

DETAILED DESCRIPTION OF THE EMBODIMENTS

The technical solutions in the embodiments of the present disclosure will be described in a clear and complete manner in the following with reference to the accompanying drawings in the embodiments of the present disclosure. Obviously, the embodiments described are merely part but not all embodiments of the present disclosure. All other embodiments obtained by those of ordinary skill in the art based on the embodiments of the present disclosure without creative work are within the scope of the present disclosure.

A COA liquid crystal display panel comprises:

an upper substrate, a lower substrate facing the upper substrate, and a liquid crystal layer disposed between the upper substrate and the lower substrate, wherein the upper substrate includes a first base plate, a black matrix layer, a common electrode layer, and spacers, and wherein the lower substrate includes a second base plate, a gate electrode insulation layer, a color barrier layer, a protective layer, a pixel electrode layer, and a flat layer.

Figure 1:
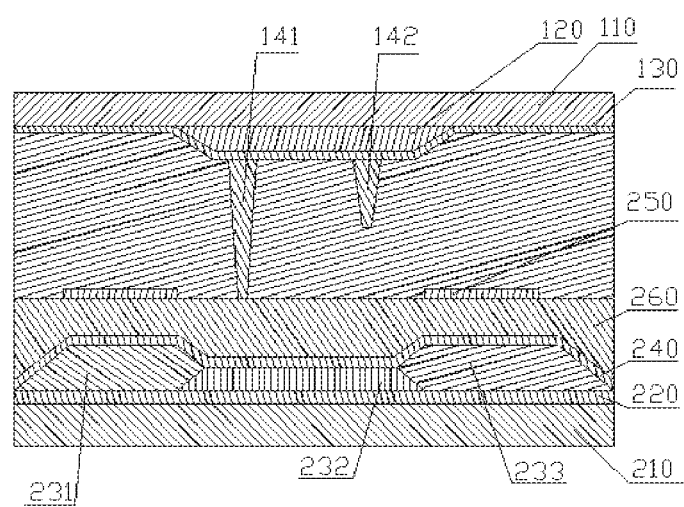
FIG. 1 schematically shows the structure of a liquid crystal display panel in the prior art.
Figure 2:
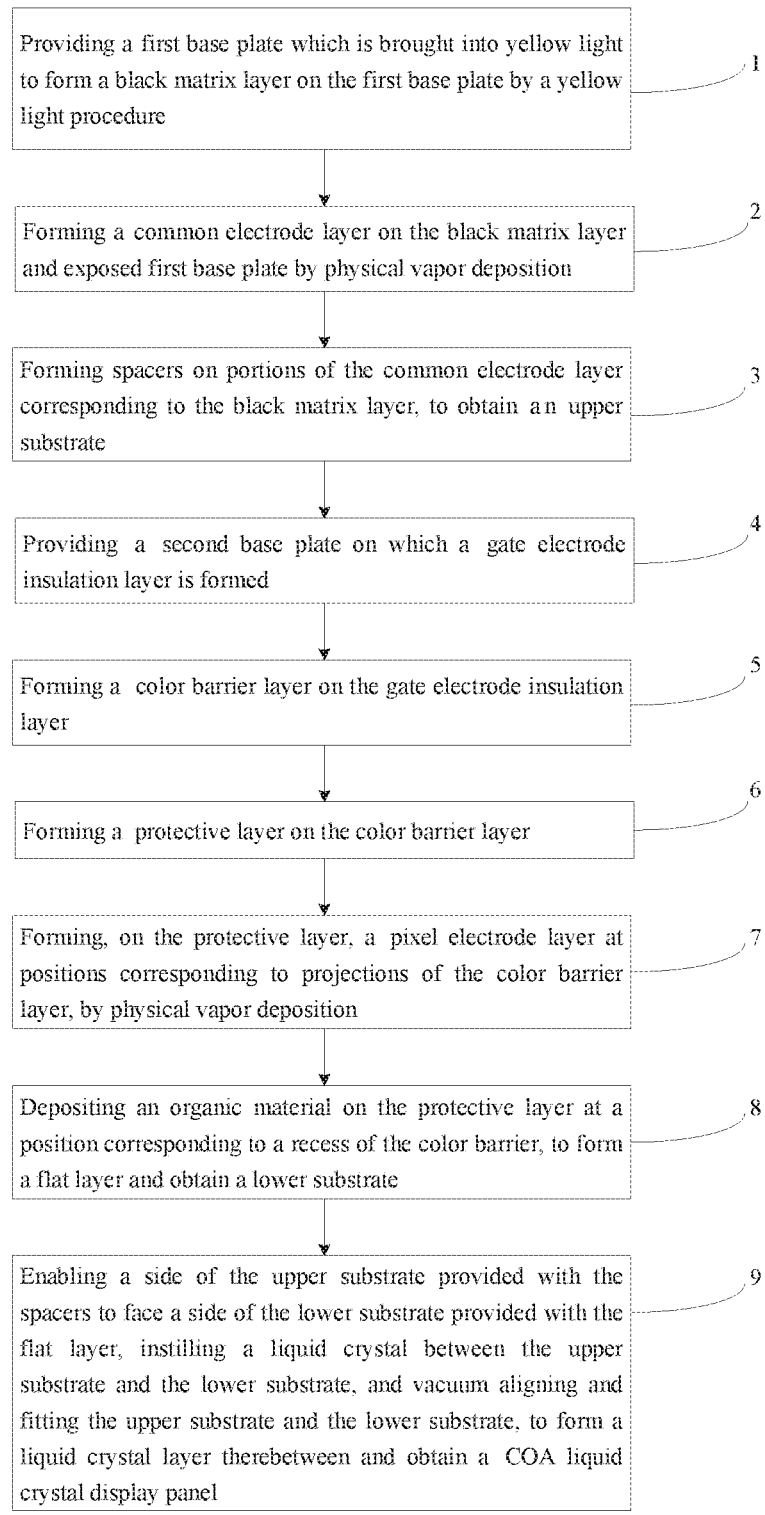
FIG. 2 shows a flow chart according to one specific embodiment of the present disclosure.

Specifically, the COA liquid crystal display panel is prepared according to a manufacturing method shown in FIG. 2, comprising the following steps.

Figure 3:
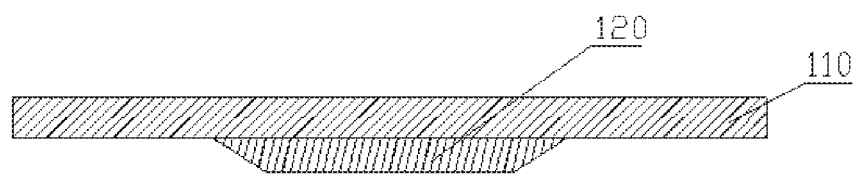
FIG. 3 is a diagram after formation of a black matrix layer on a first base plate according to one specific embodiment of the present disclosure.

In step 1), as shown in FIG. 3, a first base plate 110 is provided, and brought into yellow light, to form a black matrix layer on the first base plate 110 by a yellow light procedure.

The first base plate 110 is made of a glass substrate.

The black matrix layer 120 is made of a black photoresist material.

The yellow light procedure specifically includes a photoresist coating step, an exposure step, a developing step, and a curing step.

Figure 4:
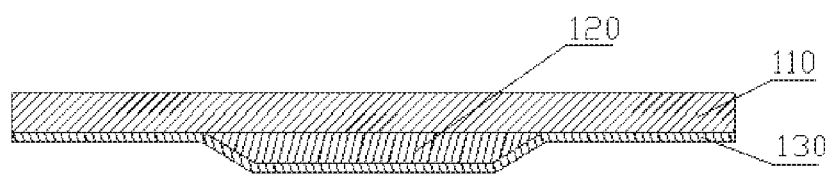
FIG. 4 is a diagram after formation of a common electrode layer on the black matrix layer and bare first base plate according to one specific embodiment of the present disclosure.

In step 2), as shown in FIG. 4, a common electrode layer 130 is formed on the black matrix layer 120 and exposed first base plate 110 by physical vapor deposition.

The common electrode layer 130 is made of indium tin oxide.

Figure 5:
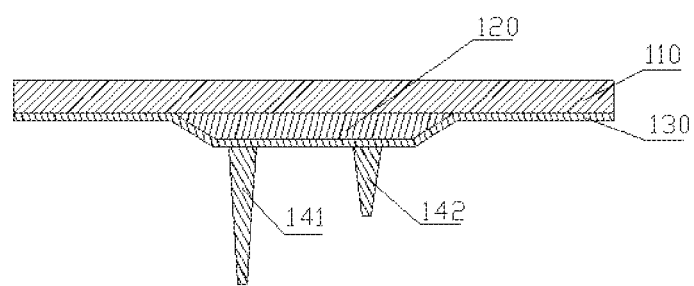
FIG. 5 is a diagram after formation of spacers on the common electrode layer at portions corresponding to the black matrix layer according to one specific embodiment of the present disclosure.

In step 3), as shown in FIG. 5, spacers are formed on portions of the common electrode layer 130 corresponding to the black matrix layer 120, to obtain the upper substrate.

The spacers are tapered columns comprising a main spacer 141 and a secondary spacer 142.

The main spacer 141 and the secondary spacer 142 are of a same material, both being an elastic material. The main spacer 141 has a greater height than the secondary spacer 142.

Figure 6:
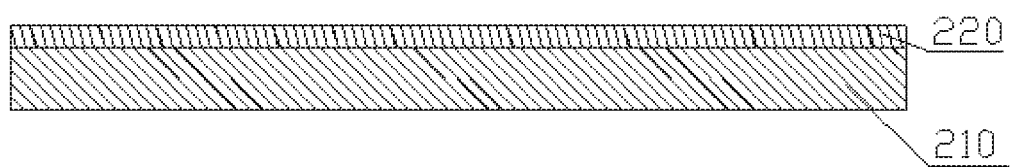
FIG. 6 is a diagram after formation of a gate electrode insulation layer on a second base plate according to one specific embodiment of the present disclosure.

In step 4), as shown in FIG. 6, a second base plate 210 is provided, on which a gate electrode insulation layer 220 is formed.

The second base plate 220 is made of a glass substrate.

Figure 7:
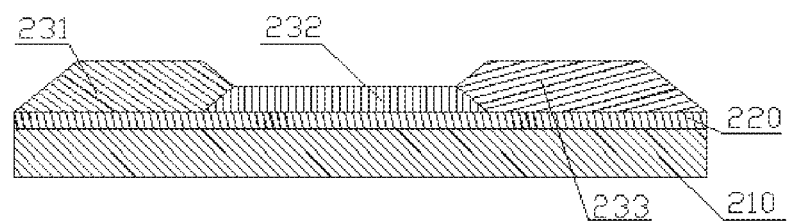
FIG. 7 is a diagram after formation of a color barrier layer on the gate electrode insulation layer according to one specific embodiment of the present disclosure.

The gate electrode insulation layer 220 is made of silicon nitride;

In step 5), as shown in FIG. 7, a color barrier layer is formed on the gate electrode insulation layer 220, wherein the color barrier layer includes a red color barrier 231, a blue color barrier 232, and a green color barrier 233. The red color barrier 231 and the green color barrier 233 are two projections, while the blue color barrier 232 is a recess. The red color barrier 231 and the green color barrier 233 are spaced from each other and have a same thickness. The blue color barrier 232 has a smaller thickness than the red color barrier 231 or the green color barrier 233.

The blue color barrier 232 is provided corresponding to the main spacer 141 and the secondary spacer 142.

Figure 8:
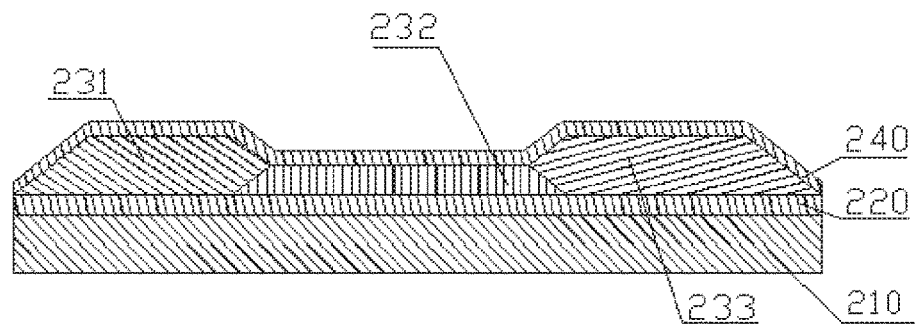
FIG. 8 is a diagram after formation of a protective layer on the color barrier layer according to one specific embodiment of the present disclosure.

In step 6), as shown in FIG. 8, a protective layer 240 is formed on the color barrier layer.

The protective layer 240 is made of silicon oxide.

Figure 9:
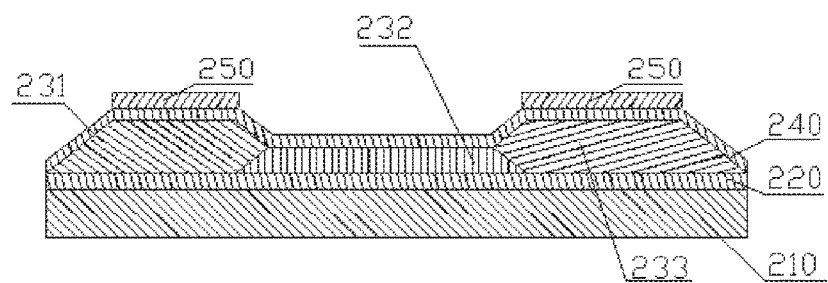
FIG. 9 is a diagram after formation of a pixel electrode layer on the protective layer at positions corresponding to projections of the color barrier layer according to one specific embodiment of the present disclosure.

In step 7), as shown in FIG. 9, a pixel electrode layer 250 is formed by physical vapor deposition on the protective layer 240 at positions corresponding to the projections of the color barrier layer.

The pixel electrode layer 250 is made of indium tin oxide.

Figure 10:
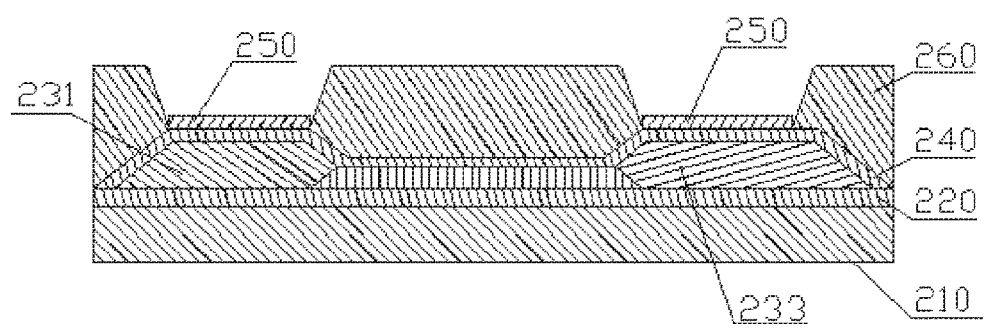
FIG. 10 is a diagram after an organic material is deposited to form a flat layer on the protective layer at a position corresponding to a recess of the color barrier layer according to one specific embodiment of the present disclosure.

In step 8), as shown in FIG. 10, an organic material is deposited on the protective layer 240 at a position corresponding to the recess of the color barrier layer, to form a flat layer 260 and obtain the lower substrate.

The flat layer 260 is made of a transparent organic material.

Figure 11:
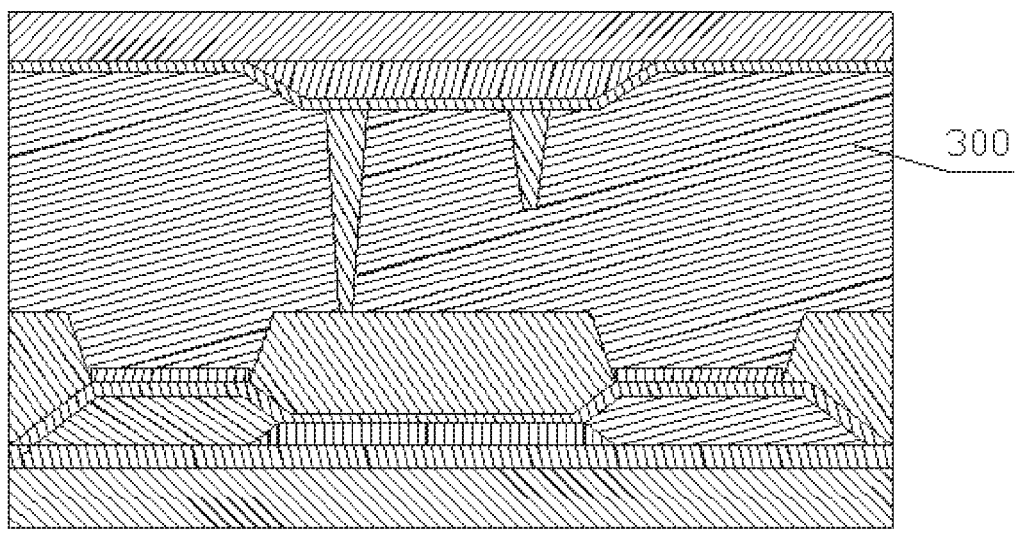
FIG. 11 schematically shows a COA liquid crystal display panel according to one specific embodiment of the present disclosure.

In step 9), as shown in FIG. 11, a side of the upper substrate provided with the spacers is enabled to face a side of the lower substrate provided with the flat layer 260. A liquid crystal is instilled between the upper substrate and the lower substrate, and the upper substrate and the lower substrate are vacuum aligned and fit together, to form a liquid crystal layer 300 therebetween and obtain the COA liquid crystal display panel.

The liquid crystal layer 300 includes at least one polar liquid crystal monomer and at least one nonpolar liquid crystal monomer, and liquid crystal molecules in the liquid crystal layer 300 are negative liquid crystal molecules.

Compared with the prior art, in the present embodiment, the pixel electrode 250 is formed on the protective layer 240 at the positions corresponding to the red color barrier 231 and the green color barrier 233, i.e., less flat layer 260 is used. That is, light successively passes through the second base plate 210, the gate electrode insulation layer 220, the color barrier layer, the protective layer 240, the pixel electrode layer 250, the liquid crystal layer 300, the common electrode layer 130, and the first base plate 110 in the COA liquid crystal display panel prepared in the present embodiment. Less flat layer 260 is used. That is, the absorption of light is reduced, thereby improving light transmittance and reducing manufacturing costs. As a result, the problems of light transmittance and high costs of an existing liquid crystal display panel can be solved.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit or scope of the present disclosure as defined by the appended claims. It will be appreciated that the various dependent claims and the features set forth therein can be combined in different ways from those presented in the initial claims. It will also be appreciated that the features described in connection with individual embodiments may be shared with other embodiments as described.

LIST OF REFERENCE NUMBERS

110: first base plate;
120: black matrix layer;
130: common electrode layer;
141: main spacer;
142: secondary spacer;
210: second base plate;
220: gate electrode insulation layer;
231: red color barrier;
232: blue color barrier;
233: green color barrier;
240: protective layer;
250: pixel electrode layer;
260: flat layer; and
300: liquid crystal layer.

The invention claimed is:

1. A method for manufacturing the COA liquid crystal display panel, the COA liquid crystal display panel comprising an upper substrate, a lower substrate facing the upper substrate, and a liquid crystal layer disposed between the upper substrate and the lower substrate; the upper substrate including a first base plate, a black matrix layer, a common electrode layer, and spacers; the lower substrate including a second base plate, a gate electrode insulation layer, a color barrier layer, a protective layer, a pixel electrode layer, and a flat layer, the black matrix layer being provided on the first base plate; the common electrode layer being provided on the black matrix layer and exposed first base plate, the common electrode layer being in direct contact with the first base plate, and the spacers being provided on the common electrode layer corresponding to the black matrix layer;

wherein the method comprises the following steps:
step 1): providing a first base plate which is brought into yellow light to form a black matrix layer on the first base plate by a yellow light procedure,
step 2): forming a common electrode layer on the black matrix layer and exposed first base plate by physical vapor deposition,
step 3): forming spacers on portions of the common electrode layer corresponding to the black matrix layer, to obtain an upper substrate,
step 4): providing a second base plate on which a gate electrode insulation layer is formed,
step 5): forming a color barrier layer on the gate electrode insulation layer, wherein the color barrier layer includes a red color barrier, a blue color barrier, and a green color barrier; the red color barrier and the green color barrier are two projections, while the blue color barrier is a recess; the red color barrier and the green color barrier are spaced from each other and have a same thickness; and the blue color barrier has a smaller thickness than the red color barrier or the green color barrier,
step 6): forming a protective layer on the color barrier layer,
step 7): forming, on the protective layer, a pixel electrode layer at positions corresponding to the projections of the color barrier layer, by physical vapor deposition,
step 8): depositing an organic material on the protective layer at a position corresponding to the recess of the color barrier layer, to form a flat layer and obtain a lower substrate, and
step 9): enabling a side of the upper substrate provided with the spacers to face a side of the lower substrate provided with the flat layer, instilling a liquid crystal between the upper substrate and the lower substrate, and vacuum aligning and fitting the upper substrate and the lower substrate, to form a liquid crystal layer therebetween and obtain the COA liquid crystal display panel.

* * * * *